(12) United States Patent
Song et al.

(10) Patent No.: US 8,345,804 B2
(45) Date of Patent: Jan. 1, 2013

(54) SIMPLIFIED RACH PREAMBLE DETECTION RECEIVER

(75) Inventors: Lei Song, Randolph, NJ (US);
Fang-Chen Cheng, Randolph, NJ (US);
Henry H. Ye, Ledgewood, NJ (US)

(73) Assignee: Alcatel Lucent, Paris (FR)

( * ) Notice: Subject to any disclaimer, the term of this patent is extended or adjusted under 35 U.S.C. 154(b) by 749 days.

(21) Appl. No.: 11/946,541

(22) Filed: Nov. 28, 2007

(65) Prior Publication Data
US 2008/0310561 A1 Dec. 18, 2008

Related U.S. Application Data

(60) Provisional application No. 60/943,874, filed on Jun. 14, 2007.

(51) Int. Cl.
*H03D 1/00* (2006.01)

(52) U.S. Cl. ........ 375/343; 375/136; 375/137; 375/142; 375/143; 375/145; 375/147; 375/150; 375/152; 375/316; 375/340; 375/342; 370/329; 370/330

(58) Field of Classification Search .................. 375/136, 375/145, 147, 149, 316, 324, 340, 342, 137, 375/142, 143, 150, 152, 343; 370/329, 330
See application file for complete search history.

(56) References Cited

U.S. PATENT DOCUMENTS

| 6,005,900 | A | * | 12/1999 | Zangi | 375/350 |
| 6,104,767 | A | * | 8/2000 | Atarius et al. | 375/344 |
| 6,788,746 | B1 | * | 9/2004 | Mack | 375/316 |
| 7,034,632 | B2 | * | 4/2006 | Gomez et al. | 333/110 |
| 7,492,700 | B2 | * | 2/2009 | Schmidt | 370/208 |
| 7,773,967 | B2 | * | 8/2010 | Smith | 455/295 |
| 2005/0036479 | A1 | | 2/2005 | Lee et al. | |
| 2005/0254604 | A1 | | 11/2005 | MacMullan et al. | |
| 2007/0064669 | A1 | | 3/2007 | Classon et al. | |
| 2007/0165567 | A1 | | 7/2007 | Tan et al. | |
| 2007/0165588 | A1 | | 7/2007 | McCoy | |
| 2007/0225003 | A1 | | 9/2007 | Cheng et al. | |
| 2007/0291696 | A1 | * | 12/2007 | Zhang et al. | 370/331 |
| 2009/0109919 | A1 | * | 4/2009 | Bertrand et al. | 370/330 |
| 2010/0002573 | A1 | * | 1/2010 | Baldemair et al. | 370/210 |

FOREIGN PATENT DOCUMENTS

| EP | 0 549 451 | 12/1992 |
| EP | 1 566 936 | 1/2005 |

OTHER PUBLICATIONS

"R2-070326", 3GPP RAN WG2 56 bis, Jan. 15-17, 2007, pp. 1-2.*
International Search Report dated Sep. 25, 2008.
European Search Report dated Dec. 9, 2010.

(Continued)

*Primary Examiner* — Sam K Ahn
*Assistant Examiner* — Sophia Vlahos
(74) *Attorney, Agent, or Firm* — Fay Sharpe LLP

(57) ABSTRACT

A low complexity RACH preamble detector is described herein. The RACH preamble detection algorithm uses the peak detection of the time domain correlation function through frequency domain processing. The frequency domain processing considers the reference signals generated directly from frequency domain CAZAC sequence or time domain CAZAC sequence with DFT conversion. A low-complexity poly-phase LPF along with down sampling is implemented before the FFT to reduce the required length of the long FFT operation N-folded.

13 Claims, 2 Drawing Sheets

OTHER PUBLICATIONS

Texas Instruments: "RACH Preamble Design", 3GPP Draft; R1-050777, $3^{rd}$ Generation Partnership Project (3GPP), Mobile Competence Centre, Sophia-Antipolis Cedex, France, vol. RAN WG1, No. London UK; Aug. 25, 2005.

"Spreading and Modulation (FDD)", 3GPP Standard; 3GPP TS 25.213, $3^{RD}$ Generation Partnership Project (3GPP), Mobile Competence Centre, Sophia-Antipolis Cedex, France, vol. V7.1.0, Mar. 1, 2007, pp. 1-33.

Nortel Networks: "On the preamble design of non-synchronized RACH", 3GPP Draft, R1-061841, $3^{rd}$ Generation Partnership Project (3GPP), Mobile Competence Centre, Sophia-Antipolis Cedex, France, vol. RAN WG1, no. Cannes, France; Jun. 20, 2006.

Nortel Networks: "Consideration on UL RACH scheme for LTE", 3GPP Draft, R1-060653, RACH, $3^{rd}$ Generation Partnership Project (3GPP), Mobile Competence Centre, Sophia-Antipolis Cedex, France, vol. RAN WG1, no. Denver, USA; Feb. 9, 2006.

Rohde & Schwarz Products "UMTS Long Term Evolution (LTE) Technology Introduction", C. Gessner, Mar. 2007, pp. 1-32.

Masson, Romain, "E-UTRA RACH Within the LTE System", Master's Degree Project, Stockholm, Sweden, Feb. 3, 2006, pp. 1-64.

* cited by examiner

SIMPLIFIED RACH PREAMBLE DETECTION RECEIVER

This application claims priority from U.S. Provisional Application Ser. No. 60/943,874 filed on Jun. 14, 2007.

BACKGROUND OF THE INVENTION

This invention relates to a method and apparatus for RACH preamble detection. While the invention is particularly directed to the art of telecommunications, and will be thus described with specific reference thereto, it will be appreciated that the invention may have usefulness in other fields and applications.

By way of background, The 3rd Generation Partnership Project (3GPP) is a collaboration agreement that was founded in December 1998. The scope of 3GPP is to make a globally applicable third generation (3G) mobile phone system specifications for UMTS (3G systems based on the evolved GSM core network and the Universal Terrestrial Radio Access (UTRA) in FDD and TDD mode and GSM including evolved GSM radio access technologies (GPRS, EDGE).

The 3GPP standardization department is currently working on the 3G Long Term Evolution (LTE). See, for example, 3GPP TR 25.912 and 25.913. Important parts of such a long-term evolution include reduced latency, higher user data rates, improved system capacity and coverage, and reduced cost for the operator. In order to achieve this, an evolution of the radio interface as well as the radio network architecture will be considered. Considering a desire for even higher data rates and also taking into account future additional 3G spectrum allocations the long-term 3GPP evolution will include an evolution towards support for wider transmission bandwidth than 5 MHz At the same time, support for transmission bandwidths of 5 MHz and less than 5 MHz will be investigated in order to allow for more flexibility in whichever frequency bands the system may be deployed.

The Random Access Channel (RACH) is a contention-based channel for initial uplink transmission, i.e., from UE (User Equipment) to NodeB (base station). This channel can be used for several purposes. The RACH function is different depending on the technology of the system. The RACH can be used to access the network, to request resources, to carry control information, to be the reference of adjusting the time offset of the uplink, to be the reference of adjusting the transmitted power, and to transmit small amounts of data. Contention resolution is a key feature of the random access channel. Many UE can attend to access a same base simultaneously, leading to collisions.

Several options are available for multiplexing between the RACH and scheduled-based channels, Time Division Multiplexing (TDM), Frequency Division Multiplexing (FDM), and Code Division Multiplexing (CDM).

The RACH format in the Universal Mobile Telecommunications System (UMTS) LTE system generally includes a 0.1 ms cyclic prefix, a 0.8 ms RACH preamble and a 0.1 ms guard time. The LTE system is designed to process the 0.8 ms RACH preamble collectively to enable more processing gain for the preamble detection. The collective processing of the 0.8 ms RACH preamble requires a long fast Fourier transform (FFT) to convert the time domain to frequency domain preamble signals. The length of the long FFT depends on the number of samples in the 0.8 ms length, which is inversely proportional to the duration of the each sampling. For example, the number of samples in a 5 MHz system is 6144 in the 0.8 ms duration. Thus, it requires a FFT length of 6144 to process. Since the RACH information embeds in the central 1.08 MHz of the overall spectrum (e.g., 5 MHz), the RACH information needs to be extracted out from the frequency domain output of the Long FFT processing before proceeding to the detection.

The present invention contemplates a new and improved method and apparatus that resolves the above-referenced difficulties and others.

SUMMARY OF THE INVENTION

A method and apparatus for RACH preamble detection are provided. The RACH preamble detection method and apparatus uses the peak detection of the time domain correlation function through frequency domain processing. The frequency domain processing considers the reference signals generated directly from frequency domain CAZAC sequence or time domain CAZAC sequence with DFT conversion. A low-complexity poly-phase LPF along with down sampling is implemented before the FFT to reduce the required length of the long FFT operation N-folded.

In accordance with an aspect of the present invention a method of detecting a preamble sequence in a signal is provided. The method comprises: receiving a wideband OFDM signal; filtering the narrow band signal from the wideband OFDM signal; down sampling the filtered signal by a factor of N; converting the filtered signal from a time domain signal to a frequency domain signal; extracting a narrow band random access channel (RACH) signal from the frequency domain filtered signal; correlating the extracted signal with a reference sequence to generate a time domain correlation sequence output; and detecting a peak of the time domain correlation sequence output.

In accordance with another aspect of the present invention an apparatus for detecting a preamble sequence in a signal is provided. The apparatus comprises: a low pass filter for filtering a signal; an N-time down sampling module for down sampling the filtered signal by a factor of N; a long fast Fourier transform (FFT) module for converting the filtered signal from a time domain signal to a frequency domain signal; an extraction module for extracting a signal from the frequency domain signal; a correlation module for correlating the extracted signal with a reference sequence to generate a time domain correlation sequence output; an inverse discrete Fourier transform module; and a peak detection module for detecting a peak of the time domain correlation sequence output.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
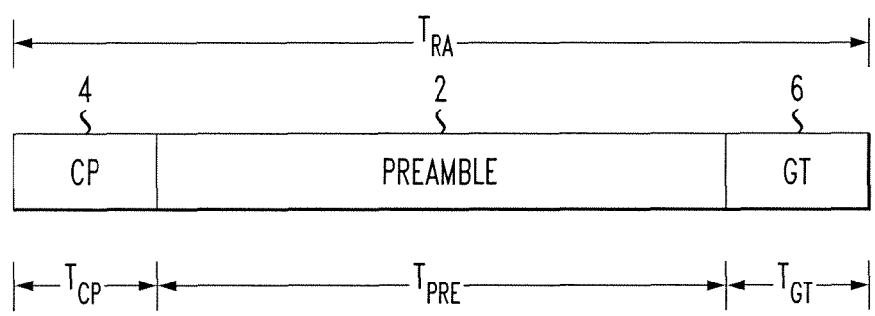
FIG. 1 is an illustration of RACH format.

Referring now to the drawings wherein the showings are for purposes of illustrating the exemplary embodiments only and not for purposes of limiting the claimed subject matter, the RACH processing in an LTE UL (uplink) receiver is based on the RACH format shown in FIG. 1.

Multiple random access channels may be defined in the time or frequency domain within one access period $T_{RA}$ in order to provide a sufficient number of random access opportunities. For the random access, a preamble sequence 2 is defined as shown in FIG. 1. The preamble sequence 2 occupies 0.8 ms ($T_{PRE}$=0.8 ms) and a cyclic prefix (CP) 4 occupies 0.1 ms (Tcp=0.1 ms) within one subframe of 1 ms. During a guard time (GT) 6 (TGT=0.1 ms) nothing is transmitted. The preamble bandwidth is 1.08 MHz (72 sub-carriers). Higher layer signaling controls in which sub-frames the preamble transmission is allowed and the location in the frequency domain. Per cell, there are 64 random access preambles.

The guard time 6 may be added to combat inter-OFDM (Orthogonal Frequency Division Multiplexing) symbol interference due to propagation delay. The cyclic prefix 4 is typically a copy of the last portion of the data symbol appended to the front of the symbol during the guard interval. The preamble 2 indicates that a certain system is about to transmit data, and is defined by a string of certain transmission pulses recognized by the communication systems. Pulses for a preamble vary depending on the network technologies adopted.

The LTE system processes the 0.8 ms RACH preamble 2 collectively to enable more processing gain for the preamble detection. The collective processing of the 0.8 ms RACH preamble 2 requires a long FFT to convert the time domain to frequency domain preamble signals. The length of the long FFT depends on the number of samples in the 0.8 ms preamble length, which is inversely proportional to the duration of the each sampling. For example, the number of samples in a 5 MHz system is 6144 in the 0.8 ms duration. Thus, it requires a FFT length of 6144 to process. Since the 1.08 MHz RACH information is embedded in the center part of the overall spectrum (e.g., 5 MHz), the RACH information is extracted after the long FFT processing. The extraction of the RACH information is obtained by filtering out the subcarriers in the frequency domain. Combining the RACH extraction and FFT processing reduces the complexity of the RACH detection design.

Figure 2:
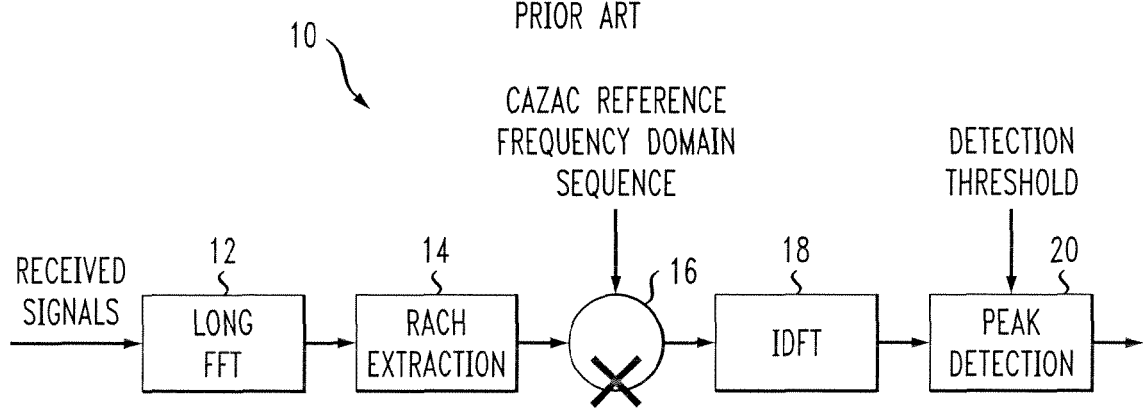
FIG. 2 is a block diagram of a common LTE RACH Preamble Detection Receiver.

The functional modules of a conventional RACH preamble detection receiver 10 are shown in FIG. 2. The RACH preamble detection receiver 10 contains a long FFT (e.g., 6144) module 12, a RACH extraction module 14, a RACH correlation module 16, an IDFT (inverse discrete Fourier transform) processing module 18, and a peak detection functional module 20. The function of the RACH correlation module 16 is to multiply the extracted RACH signals with the reference sequence in the frequency domain. Reference signals are typically CAZAC (Constant Amplitude Zero Autocorrelation) sequences. A CAZAC waveform is a periodic complex-valued signal with modulus one and zero autocorrelation.

The reference sequence in the frequency domain is generated in the time or frequency domain in the following manner:

If the transmitted CAZAC sequence is generated at the frequency domain after single carrier operation, then the reference sequence is directly generated from the frequency domain CAZAC sequence.

If the CAZAC sequence is generated before single carrier DFT process, then the reference sequence is generated in the time domain and then goes through a DFT processing.

The time domain RACH correlation sequence is obtained from the frequency domain RACH spectrum correlation output through IDFT processing. The time domain RACH correlation sequence contains the auto and correlation functions of the transmitting CAZAC sequence. The propagation delay of the transmitted RACH sequence reflects directly on the auto-correlation function. Since the CAZAC sequence for the RACH transmission poses the property of low cross-correlation, the desired auto-correlation function is the peak of the time domain RACH correlation sequence. Thus, the RACH detection is simply a peak detection of the time domain RACH correlation output.

Figure 3:
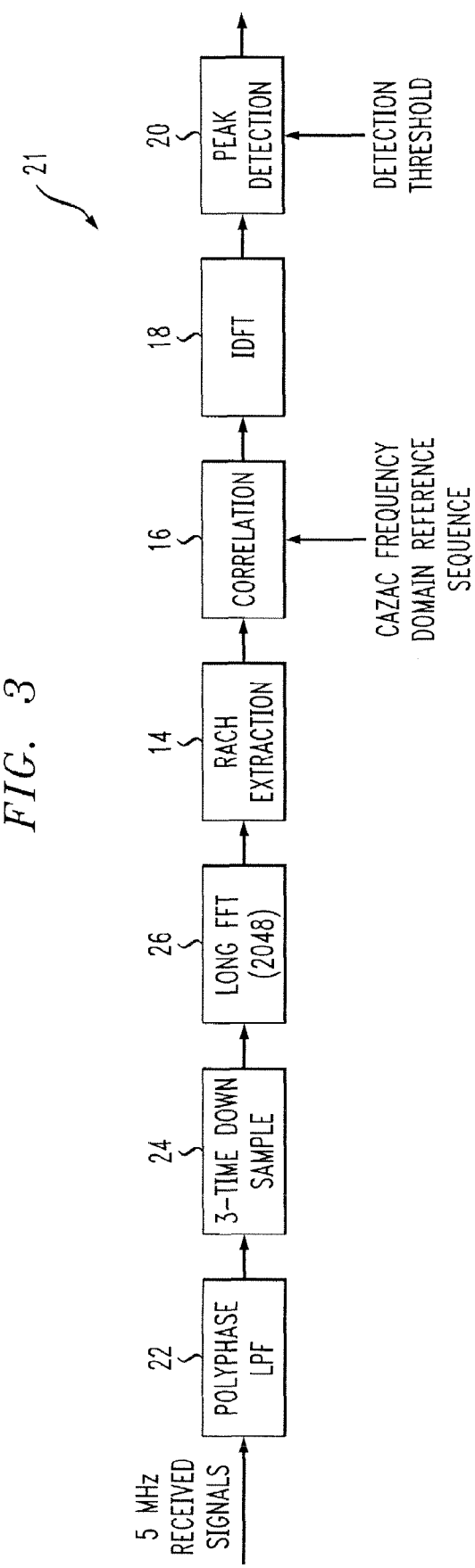
FIG. 3 is a block diagram of an improved LTE RACH Preamble Detection Receiver in accordance with aspects of the present invention.

We now turn our attention to FIG. 3, which illustrates an exemplary RACH preamble detection receiver 21 in accordance with the present invention. Initially, a wideband signal such as an OFDM signal is received by the receiver 21. The RACH preamble detection receiver 21 needs to extract the 1.08 MHz RACH information from the overall transmission bandwidth (e.g., 5, 10, 20 MHz) after the long FFT processing (converting the time domain to frequency domain signals). The extraction processing represents the filtering and selection of the frequency domain signals. The filtering of the input signals removes the portion of non-RACH sub-carriers within the 0.8 ms preamble. The RACH is mapped to the central 6 Physical Resource Block (PRB) of the spectrum in the LTE system. The RACH information is contained at the central 1.08 MHz bandwidth out of overall transmission bandwidth (e.g., 5, 10, 20 MHz). Thus, removing the non-RACH sub-carriers in the frequency domain is equivalent to having a short length, low pass filter (LPF) 22 at the time domain before a simplified RADIX-2 FFT module 26, as shown in FIG. 3. The output of the LPF 22 contains narrow band information in the time domain.

To simplify the LPF design, the filter bandwidth is set to be larger than the desired 1.08 MHz to allow longer transition band. The narrow band information contains mostly the RACH information with additional noise. The RACH information is repeated a few samples after the low pass filtering. Thus, the output of the LPF 22 is sent to a down sample module 24. The down sampling rate depends on the bandwidth of the LPF 22. The N-time down sampled signals in time domain implies the N-time length reduction required for the long FFT operation. The overall arithmetical operation will be reduced N-times in the FFT 26 with additional complexity in the LPF 22. For a 5 MHz system, N is set to 3 because the filter bandwidth is around ⅓ of the total bandwidth (1.66 MHz) to allow the longer transition band and to extract the 1.08 MHz RACH information. In FIG. 3, the 5 MHz signals are low-pass filtered and 3-time down sampled. RADIX-2 FFT processing is applied to the down sampled signal to convert the signal from the time domain to the frequency domain. The long FFT length is thus reduced 3 times from 6144 to 2048. The 2048 FFT also has the advantage of complexity reduction since it is a RADIX-2 FFT operation.

The objective of the LPF design is the reduction of the overall computation in the RACH receiver. The low pass filter (LPF) will remove most of the RACH out-of-band information. The LPF design does not intend to remove all out-of-band signals. The length and the coefficients of the LPF determine the transition band property and the additional computation complexity. The complexity increases as the filter length increases and the bit width of the coefficient. The LPF 22 is designed to have a short filter length and a low bit width to minimize the increase of the computational complexity in the RACH receiver. A poly-phase LPF is considered to filter out roughly most of the out-of-band signals for the RACH. For example, the 5 MHz bandwidth signals may be filtered to around 1.67 MHz in bandwidth. The 1.67 MHz signals may then be down sampled 3 times to allow 2048 FFT operation before RACH signal extraction.

In summary, a low complexity RACH preamble detector is described herein. The RACH preamble detection algorithm uses the peak detection of the time domain correlation function through frequency domain processing. The frequency domain processing considers the reference signals generated directly from frequency domain CAZAC sequence or time domain CAZAC sequence with DFT conversion. A low-complexity poly-phase LPF along with down sampling is implemented before the FFT to reduce the required length of the long FFT operation N-folded. The performance results show that it would barely see any degradation with this implementation.

Some portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of detecting a preamble sequence in a signal in a Universal Mobile Telecommunications System (UMTS) Long Term Evolution (LTE) system, the method comprising:
    receiving a wideband OFDM signal comprising a burst of a random access channel (RACH);
    filtering a narrow band signal from the wideband OFDM signal, wherein the narrow band signal comprises the preamble sequence, and wherein the filtering operation filters or extracts RACH information which has been mapped to at least one physical resource block of a spectrum in the LTE system;
    down sampling the filtered signal by a factor of N; wherein N is an integer greater than 1;
    applying RADIX-2 FFT processing to convert the down sampled signal from a time domain signal to a frequency domain signal;
    extracting a narrow band random access channel (RACH) signal from the frequency domain filtered signal;
    correlating the extracted signal with a reference sequence to generate a frequency domain correlation sequence output;
    obtaining a time domain correlation sequence output through inverse discrete Fourier transform processing of the frequency domain correlation sequence output; and
    detecting a peak of the time domain correlation sequence output, wherein the peak of the time domain correlation sequence output is the preamble sequence.

2. The method of claim 1, wherein N is 3.

3. The method of claim 1, wherein the filtering operation comprises a low pass filtering operation.

4. The method of claim 1, wherein the reference sequence comprises a constant amplitude zero autocorrelation (CAZAC) sequence.

5. The method of claim 1, wherein the wideband OFDM signal has both RACH and non-RACH subcarriers; and
    wherein filtering the wideband OFDM signal includes removing the non-RACH subcarriers from the preamble in the frequency domain.

6. The method of claim 1, wherein the narrow band signal comprises RACH information and noise, and
    wherein the RACH information is repeated a plurality of samples after the low pass filtering of the narrow band signal.

7. The method of claim 3,
    wherein the sampling rate of the down sampling operation depends on the bandwidth of the low pass filtering operation.

8. The method of claim 3, wherein a bandwidth of the low pass filtering operation is larger than the preamble sequence bandwidth.

9. An apparatus for detecting a preamble sequence in a signal in a Universal Mobile Telecommunications System (UMTS) Long Term Evolution (LTE) system, the apparatus comprising:

a low pass filter that is operative to filter a narrow band signal from a wide band signal, wherein the wide band signal comprises a burst of a random access channel (RACH) and the narrow band signal comprises the preamble sequence and the low pass filter is further operative to filter or extract RACH information which has been mapped to at least one physical resource block of a spectrum in the LTE system;

an N-time down sampling module that is operative to down sample the filtered signal by a factor of N; wherein N is an integer greater than 1;

a simplified RADIX-2 fast Fourier transform (FFT) module that is operative to apply RADIX-2 FFT processing to the down sampled signal to convert the down sampled signal from a time domain signal to a frequency domain signal;

an extraction module that is operative to extract a signal from the frequency domain signal;

a correlation module that is operative to correlate the extracted signal with a reference sequence to generate a frequency domain correlation sequence output;

an inverse discrete Fourier transform (IDFT) processing module that is operative to obtain a time domain correlation sequence output through IDFT processing of the frequency domain correlation sequence output; and a peak detection module that is operative to detect a peak of the time domain correlation sequence output, wherein the peak of the time domain correlation sequence output is the preamble sequence.

10. The apparatus of claim 9, wherein N is 3.

11. The apparatus of claim 9, wherein the reference sequence comprises a constant amplitude zero autocorrelation (CAZAC) sequence.

12. The apparatus of claim 9, wherein the wideband OFDM signal comprises both RACH and non-RACH subcarriers, and wherein the low pass filter is operative to remove non-RACH subcarriers from the preamble in the frequency domain.

13. The apparatus of claim 9,
wherein the sampling rate of the down sampling module depends on the bandwidth of the low pass filter.

* * * * *